April 26, 1960  F. F. OFFNER  2,934,699
APPARATUS FOR TEST-MEASURING ELECTRICAL COMPONENTS
Filed June 15, 1954
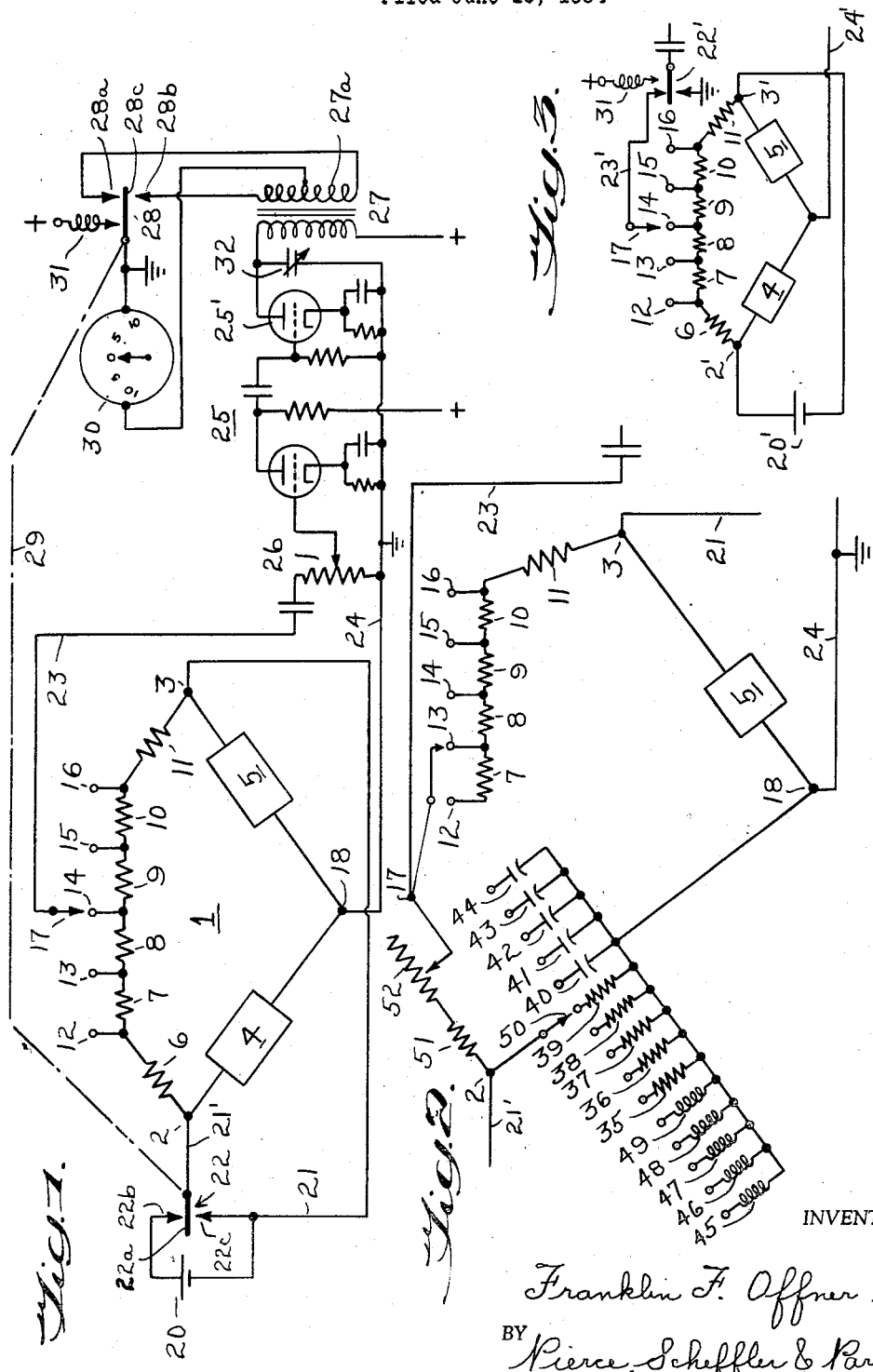
INVENTOR
Franklin F. Offner
BY Pierce, Scheffler & Parker
ATTORNEYS

2,934,699
APPARATUS FOR TEST-MEASURING ELECTRICAL COMPONENTS

Franklin F. Offner, Chicago, Ill.

Application June 15, 1954, Serial No. 436,803

4 Claims. (Cl. 324—57)

The present invention relates to electrical bridges used for test-measuring electrical components such as resistors, capacitors and inductances.

In the past, both direct current and alternating current excited electrical bridges have been widely applied for the measurement of the value of circuit components, the direct current excited bridges being used only for the measurement of resistance values. A direct current excited bridge has the disadvantage of requiring either a sensitive galvanometer indicator, not usually suitable for high speed production use, or a direct current vacuum tube amplifier indicator which is frequently unstable in balance point.

Bridges excited by aternating current require complex discriminator circuits to give an output indication which gives the direction as well as the amplitude of the deviation of the balance from zero. Such discriminators may also suffer from a shift in the zero position. Furthermore, if commercial power line frequency is used as the source of the alternating exciting current, the accuracy of the bridge is suceptible to error due to pick-up of stray power line voltages.

This invention makes it possible to eliminate all the disadvantages which attend the prior art constructions for direct and alternating current excited bridges and is based upon the use of synchronously operated switch means at the input and output sides of the bridge.

The foregoing and other objects of the invention will become more apparent from the following detailed description of several different embodiments of bridges constructed in accordance with the invention and in conjunction with the drawings appertaining thereto.

Fig. 1 of these drawings is a circuit diagram illustrating an improved measuring circuit of the bridge type incorporating the present invention.

Fig. 2 is a fragmentary circuit diagram illustrating a modification for the bridge component shown in Fig. 1; and Fig. 3 is also a fragmentary circuit daigram illustrating another modification of the Fig. 1 measuring circuit wherein the switching means, at the input, being of the vibrator type, is arranged at the output side of the bridge component.

With reference now to Fig. 1, one side of the bridge 1, i.e. between one pair of diagonal points 2 and 3 constituting the power input terminals, includes a "standard" arm 4 such as a resistor or capacitor or inductor, the electrical value of which is known, and "unknown" arm 5 the electrical value of which it is desired to determine, the arms 4 and 5 being connected in series. The other side of the bridge between input terminals 2 and 3 is composed of a plurality of series connected resistance components 6-11 which establish the two ratio arms. A tap 12 is provided between resistances 6 and 7 and similar taps 13-16 are provided between the other resistances 7-11. A contact member 17 movable along the taps 12-16 constitutes one output terminal of the bridge and the other output terminal is constituted by a connection at point 18 in the circuit between the two bridge arms 4 and 5. When contact member 17 is connected to tap 14, the resistance of the ratio arm constituted by the sum of resistances 6-8 is equal to the resistance of the other ratio arm constituted by thes um of resistances 9-11 and the bridge is symmetrical at balance. The other tap points 12, 13, 15 and 16 are for purposes of calibration as will be hereinafter discussed.

The power input to the bridge 1 at terminals 2 and 3 is constituted by a battery 20. One side of this battery is connected via lead 21 to input terminal 3 and the other side of the battery is connected via lead 21' to the other input terminal 2 through a vibratory mechanical contactor type switch 22, the blade 22a of which vibrates between and makes contact alternately with stationary contacts 22b, 22c. Thus by periodically transferring lead 21' through the agency of blade 22a from one side of battery 20 to the other, as blade 22a touches first contact 22b and then contact 22c, while lead 21 from the opposite terminal of the battery remains connected to one side of the battery, an essentially alternating current input having a rectangular wave form is produced. Actually the input has a direct current component also but the latter is of no significance in the operation of the bridge. Lead 21 may alternatively be connected to a center point on battery 20, in which case the rectangular wave does not have a direct current component.

The output voltage of the bridge at terminals 17 and 18 is connected via leads 23, 24 to the input of a two-stage electron tube amplifier 25 of known construction having an input gain control 26 and an output transformer 27. The output from the secondary 27a of transformer 27 is rectified by another vibratory mechanical contactor type switch 28 operated synchronously with switch 22 as indicated schematically by the linkage 29 extending between the two switches. The stationary contacts 28a, 28b of switch 28 are connected to the opposite ends of the transformer secondary 27a and the vibrating blade contact 28c is connected through an output current indicator meter 30 of the zero center type, which indicates current flow in either direction through the meter, to a center tap on the transformer secondary 27a. Vibration of the blade contacts of the two switches 22 and 28 is maintained by a driver coil 31. The switches 22 and 28 will vibrate at their own natural frequency which is preferably selected to be different from the usual 60 cycle power-line frequency and consequently the detector circuits will not respond to pick-up of power-line frequencies. This is of considerable practical advantage. Another advantage inherent in the arrangement which has been described is that the linkage 29 between the movable contacts of the input switch 22 and output switch 28 assures simultaneous operation of the contacts of both switches independent of any variation in the driver means therefor. Thus the linkage 29 insures that the synchronism between the two switches is locked in substantially zero phase relationship, i.e. no drift between input and output is possible and hence avoids the necessity for manual adjustment of one switch in relation to the other as is required when an electronic phase discriminator is employed.

Operation of the embodiment of the invention illustrated in Fig. 1 will first be described assuming resistors are to be checked for accuracy. Assume the nominal value of such resistor to be 1,000 ohms. A resistor of exactly this value is placed in the bridge 1 as the "unknown" arm 5, and a variable resistor is placed in the bridge as the "standard" arm 4. With switch contact 17 at the center tap 14 and control 26 at maximum, the variable resistor 4 is adjusted until meter 30 reads zero thereby balancing the bridge. Assume that it is desired to read deviations in resistor values up to ten percent.

Switch contact 17 is connected to tap 12. This unbalances the bridge the same percentage as if resistor 5 were ten percent low in value. Control 26 is now adjusted until meter 30 is brought to the desired deflection indicative of a ten percent "low" value resistor. Switch contact 17 is now connected to tap 16. This unbalances the bridge the same percentage as if the resistor 5 were ten percent "high" in value. The deflection of meter 30 is now indicative of a ten percent "high" value resistor.

The tap positions 13 and 15 are for lower tolerance range; e.g., plus and minus two percent. Other positions for more calibration points can, of course, be provided. If desired, the meter 30 may be calibrated to read plus and minus deviations in value directly.

After the apparatus has been calibrated in accordance with the above procedure, the 1,000 ohm calibrating resistor is removed from the bridge arm 5 and switch contact 17 returned to its connection with the center tap 14 thus rebalancing the bridge. Thereafter, each resistor of unknown value to be checked is placed in turn in the bridge arm 5, and its percentage deviation from nominal read on the meter.

Capacitors may be checked on the bridge 1 in an exactly analogous manner. A variable capacitor is placed in bridge arm 4 and balanced, as explained above, against a capacitor of exactly nominal value placed in bridge arm 5. However, tap positions 12 and 13 of switch contact 17 now correspond to deviations from balance which would result from a capacitor of lower than nominal reactance at 5; that is, to a higher than nominal capacitance, and conversely for tap positions 15 and 16.

The contacts of the vibrator switch 28 at the output will rectify components of the output which are in phase with their operation. Since these contacts operate in phase with the contacts of the vibrator switch 22 at the input, they will therefore rectify only components which are in phase with the input. Components which are in quadrature, however, will not be rectified, and will not affect the indication on meter 30.

Any stray alternating current voltages, not of the frequency of the vibrator switches 22 and 28, will vary through all phases relative to the frequency of the vibrations. Thus the output produced thereby will be both positive and negative equally, resulting in an average of zero output to meter 30 due to such stray voltages. Thus the accuracy of the bridge is unaffected by such stray voltages.

It will be further seen that the output to meter 30 is always zero when there is no amplified output. No balance of the output detector means is involved. There is thus no possibility of a shift in the output detector balance point, as there is, for example, with the usual balanced discriminator circuit customarily employed in an alternating current bridge.

Thus, if there is no phase shift through amplifier 25, if pure resistors are placed in bridge arms 4 and 5, the output of amplifier 25 will be in phase with the operation of vibrator switch 28 and a full reading of meter 30 will result. The same result will occur if pure capacitors are placed in bridge arms 4 and 5. However if a resistor is placed in arm 4 and a capacitor in arm 5, the amplifier output will have a quadrature component, giving a reduced reading on meter 30. This effect may be made use of in making the bridge substantially responsive to only capacitive variations when being used for capacitance checking and not responsive to the resistive component (power factor) of the impedance of an actual capacitor. This is the function of a capacitor 32 connected in parallel with the anode of the output tube 25' of amplifier 25. Capacitor 32 is used to adjust the phase shift of the amplifier 25 in the following manner:

Capacitors of low, equal power factors are placed in bridge arms 4 and 5, and one adjusted to zero the meter 30. A resistor (not shown) is now placed in series with the capacitor at 5. If the pointer of meter 30 deflects, capacitor 32 is varied to return the pointer to zero reading. By experiment, the value of capacitor 32 is chosen so that the reading of meter 30 remains near zero for as much resistance at 5 as possible, or as desired. It is possible to have the pointer of meter 30 deflect only an amount equivalent to less than 0.1 percent for up to ten percent power factor at 5.

While the phase adjustment capacitor 32 is shown in parallel with the anode of output tube 25', the adjustment in phase may be accomplished in other ways, depending upon the amount and direction of the uncorrected phase shift; e.g., by adjustment of cathode or coupling condensers in the amplifier, or by having capacitor 32 arranged in parallel with other portions of the amplifier circuit.

Inductances may be checked on the bridge 1 in a manner similar to capacitors, a variable inductor being arranged as the bridge arm 4 in place of the capacitor.

As above described, the bridge 1, in its preferred form operates as a substitution bridge. The bridge may, if desired, be operated as a direct measuring bridge. For the latter type of operation, a precision resistor (for resistance bridge use) is arranged as the bridge arm 4. Meter 30 is now brought to zero with switch contact 17 at tap 14, by balancing either with a variable resistor arranged as the bridge arm 5, or by varying the resistance of bridge arm 4, with a fixed resistor of approximately the correct value arranged as bridge arm 5. The sensitivity is then set by gain control 26, when switch contact 17 is set to the point corresponding to the desired limits. Switch contact 17 is then returned to point 14 and bridge arm 4 is set to the exact desired value. For capacitance or inductance measurement, capacitances or inductances can be substituted for resistors in the direct measuring application of the bridge.

Fig. 2 illustrates a modified construction for a portion of the Fig. 1 bridge circuit that can be used when the bridge is operated as a substitution bridge. The circuit shown in Fig. 2 has the advantage that the bridge arm corresponding to the "standard" 4 of the Fig. 1 circuit is replaced by a "standard" which only need be varied in steps, rather than requiring a substantially continuous variation over the wide range required for the "standard" arm 4 in Fig. 1.

With reference now to Fig. 2 it will be seen that it is quite similar to the Fig. 1 circuit, and components which are alike in the two circuits have been assigned the same reference numerals. As explained, the principal difference resides in the use of a plurality of individually selectable resistances 35–39, and capacitors 40–44, and inductors 45–49 as the "standard" arm of the bridge. If the bridge is to be used only for resistance measuring, the capacitors and inductors will of course be omitted. Similarly, if designed only for capacitance measuring, the resistances and inductors would be omitted; and if designed only for inductance measuring, the resistances and capacitors would be omitted. One terminal of all the impedance elements 35–49 is connected to junction 13 of the bridge and the other terminal of the impedance element to be selected is connected in circuit by the movable switch contact 50 to bridge terminal 2.

For convenience in illustration, only five impedances of each type have been illustrated. However, in actual practice a sufficient number would be used to cover the desired range and they could have a ten-to-one ratio per step change in impedance.

The two ratio arms of the bridge are just about the same as in Fig. 1 except that the fixed resistor 6 of the latter is replaced by a fixed resistor 51 and a variable resistor 52, having a maximum resistance value approximately forty times greater than that of resistor 51, connected in series. Typical values of the components of the two ratio arms would be: resistor 11, 1,000 ohms; resistor 51, 300 ohms; and resistor 52, 3,300 ohms maximum. Resistors 7–10 are chosen to give the effect of the desired tolerance ranges.

The vibrator switches, electronic amplifier, and meter are arranged in the same manner as in Fig. 1 and hence only the leads from the diagonals of the bridge have been shown in Fig. 2.

Operation of the Fig. 2 bridge circuit is as follows: Assume for example that resistors of 1,000 ohms nominal value are to be checked. The switch contact 50 is set to the correct tap; e.g., to select resistor 37, which might have a value of 330 ohms. This then gives a balance range, as resistor 52 is varied, from say 92 to 1100 ohms. Switch contact 17 is now set at tap 14, and a resistor of exactly 1,000 ohms resistance value is arranged as the bridge arm 5. The bridge is then balanced by varying resistor 52, and the remainder of the procedure is as before. For capacitance or inductance measurements, a capacitor or inductor of suitable value is selected by the switch contact arm 50 and the same procedure followed as outlined with respect to measurement of resistances.

Other forms of null type measuring circuits may be used and the above two types of bridges are considered to be representative only. In addition to the conventional bridges herein described, any type of null circuit such as the double T may be employed, and all such circuits are referred hereto in the appended claims by the generic term "bridge."

In accordance with the preferred embodiments of the invention, the application of the rectangular wave alternating (or pulsating direct) current to the bridge is the preferred method of operation, since is allows the measurement of reactances as well as resistances. However, for resistance measurement only, the vibrator switch at the input side of the circuit may be arranged to follow the output of the bridge and the battery voltage applied directly to the bridge. Such an arrangement is shown in the partial wiring diagram of Fig. 3 where it will be seen that the vibrator switch 22′ is located in the bridge output lead 23′ and battery 20′ is connected directly to the bridge input terminals 2′ and 3′. The remainder of the bridge components shown in Fig. 3 are arranged in the same manner as in Fig. 1 and hence corresponding components have been assigned the same reference numerals in Fig. 3.

In conclusion it will be understood that while the embodiments of the invention that have been described and illustrated are considered to be preferred, various minor changes in the construction and arrangement of component parts may be made without however departing from the spirit and scope of the invention as defined in the appended claims.

I claim:

1. Apparatus for comparing the value of a test electrical component with the corresponding value of a standard electrical component comprising a measuring bridge including a test component connected in one arm thereof, a standard component connected in a second arm thereof, said bridge being in substantial balance at a given value of said test component, a source of direct current for energizing said bridge, means including a mechanical contactor input switch connecting said source of direct current to the input to said bridge such that said bridge receives a square wave alternating current, the phase of the bridge output relative to that of the input being determined by the comparative values of said test and standard components, an amplifier having its input connected to the output of said bridge, a zero center output indicator, a mechanical contactor output switch, driver means for periodically actuating the contacts of said input and output switches, means interlinking the operation of said contacts of said input and output switches to assure simultaneous operation thereof independent of any variation inherent in said driver means, first circuit means connecting said output switch to the output of said amplifier, and second circuit means connecting said output switch to said indicator, said output switch and said second circuit means being so connected that the current flow through said indicator is in one direction when the value of said test component is less than said given value, and in the opposite direction when greater than said given value.

2. Apparatus as defined in claim 1 for comparing the value of a test electrical component with the corresponding value of a standard electrical component, wherein said test and standard components are reactances such as capacitors or inductances and wherein the output of said amplifier includes means for adjusting the phase shift thereof such that bridge balance is substantially independent of the power factor of said test reactance component.

3. Apparatus as defined in claim 2 for comparing the value of a test electrical component with the corresponding value of a standard electrical component wherein said means for adjusting phase shift at the output of said amplifier comprises a variable reactance connected thereto.

4. Apparatus for comparing the value of a test electrical component with the corresponding value of a standard electrical component comprising a measuring bridge including a test component connected in one arm thereof, a standard component connected in a second arm thereof, said bridge being in substantial balance at a given value of said test component, a source of direct current for energizing said bridge, means including a mechanical contactor input switch connecting said source of direct current to the input to said bridge such that said bridge receives a square wave alternating current, the phase of the bridge output relative to that of the input being determined by the comparative values of said test and standard components, an amplifier having its input connected to the output of said bridge, the output of said amplifier including a transformer having a center tapped secondary winding, a mechanical contactor output switch, driver means for periodically actuating the contacts of said input and output switches, means interlinking the operation of said contacts of said input and output switches to assure simultaneous operation thereof independent of any variations inherent in said driver means, said output switch including a movable contact operated between and making alternate engagement with a pair of stationary contacts, a zero center output indicator, circuit means connecting said stationary contacts to the end terminals of said secondary winding, and circuit means connecting said movable contact and the center tap on said secondary winding to said output indicator.

References Cited in the file of this patent

UNITED STATES PATENTS

| | | |
|---|---|---|
| 574,767 | Frolich | Jan. 26, 1897 |
| 1,832,969 | Edwards et al. | Nov. 24, 1931 |
| 2,505,072 | Sunstein | Apr. 25, 1950 |
| 2,562,912 | Hawley | Aug. 7, 1951 |
| 2,633,019 | Albrecht et al. | Mar. 31, 1953 |

OTHER REFERENCES

Wald: "Electromechanical Phase Indicator"; Radio and TV News, p. 15, July 1949, 324–83.